United States Patent
Roberts et al.

(10) Patent No.: US 10,079,916 B2
(45) Date of Patent: Sep. 18, 2018

(54) REGISTER FILES FOR I/O PACKET COMPRESSION

(71) Applicant: Advanced Micro Devices, Inc., Sunnyvale, CA (US)

(72) Inventors: David A. Roberts, Cambridge, MA (US); Kevin Y. Cheng, Austin, TX (US); Nathan Hu, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 206 days.

(21) Appl. No.: 15/138,485

(22) Filed: Apr. 26, 2016

(65) Prior Publication Data

US 2017/0048358 A1 Feb. 16, 2017

Related U.S. Application Data

(60) Provisional application No. 62/204,774, filed on Aug. 13, 2015.

(51) Int. Cl.
*H04L 29/06* (2006.01)
*G06F 9/00* (2006.01)
*G06F 13/00* (2006.01)
*H04L 12/741* (2013.01)

(52) U.S. Cl.
CPC .............. *H04L 69/04* (2013.01); *G06F 9/00* (2013.01); *G06F 13/00* (2013.01); *H04L 45/74* (2013.01)

(58) Field of Classification Search
CPC ......... H04L 69/04; H04L 45/74; G06F 13/00; G06F 9/00
See application file for complete search history.

(56) References Cited

U.S. PATENT DOCUMENTS

| | | | |
|---|---|---|---|
| 5,031,174 A | 7/1991 | Natsume | |
| 7,383,423 B1 | 6/2008 | Hughes et al. | |
| 9,667,723 B2 * | 5/2017 | Pandya | H04L 67/1097 |
| 2003/0041138 A1 * | 2/2003 | Kampe | H04L 41/0893 709/223 |
| 2008/0028403 A1 | 1/2008 | Hoover et al. | |
| 2011/0055838 A1 | 3/2011 | Moyes | |
| 2012/0290756 A1 | 11/2012 | Damodaran et al. | |
| 2014/0013079 A1 | 1/2014 | Watson, Jr. et al. | |

(Continued)

OTHER PUBLICATIONS

International Search Report in International Application No. PCT/US2016/046886, dated Feb. 16, 2016, 4 pages.*

(Continued)

*Primary Examiner* — Brian J Gillis
*Assistant Examiner* — Amy Ling
(74) *Attorney, Agent, or Firm* — Meyertons Hood Kivlin Kowert and Goetzel PC; Rory D. Rankin

(57) ABSTRACT

Systems, apparatuses, and methods for reducing inter-node bandwidth are contemplated. A computer system includes requesting nodes sending transactions to target nodes. A requesting node sends a packet that includes a register identifier (ID) in place of a data value in the packet. The register ID indicates a register in the target node storing the data value. The register ID uses fewer bits in the packet than the data value. The data value may be a memory address referencing a memory location in the target node. The received packet may also include an opcode indicating an operation to perform on the targeted data value.

20 Claims, 9 Drawing Sheets

(56) References Cited

U.S. PATENT DOCUMENTS

2014/0122560 A1   5/2014  Ramey et al.
2014/0254591 A1*  9/2014  Mahadevan ............ H04L 45/16
                                                         370/390

OTHER PUBLICATIONS

International Search Report and Written Opinion in International Application No. PCT/US2016/046886, dated Nov. 23, 2016, 6 pages.*
Cheng, et al., U.S. Appl. No. 14/928,981, entitled "In-Memory Interconnect Protocol Configuration Registers", filed Oct. 30, 2015, 36 pages.

* cited by examiner

REGISTER FILES FOR I/O PACKET COMPRESSION

The present application claims priority to provisional patent application No. 62/204,774, filed Aug. 13, 2015, the entirety of which is incorporated herein by reference.

This invention was made with Government support under Prime Contract Number DE-AC52-07NA27344, Subcontract No. B608045 awarded by DOE. The Government may have certain rights in this invention.

BACKGROUND

Technical Field

Embodiments described herein relate to data processing devices and more particularly, to reducing inter-node bandwidth consumption.

Description of the Related Art

Computer systems often utilize one or more interconnects to enable communication between system components, such as between processors and memory. Interconnects can also be used to support connections to input/output (I/O) devices, other processors or accelerators. Various types of interconnect protocols are currently in use to support data transfer over different types of interconnects, and new interconnect protocols are continuously being developed and introduced into the marketplace. For example, new interconnect protocols are being expanded and developed for multi-chip configurations, exascale node architectures, processing-in-memory (PIM) architectures, high-speed memory devices. However, inter-node communication can be expensive when measured in terms of bandwidth consumption. Increased bandwidth consumption may in turn result in increased power consumption and increased communication latencies.

In view of the above, improved systems and methods for reducing inter-node bandwidth consumption are desired.

SUMMARY

Systems, apparatuses, and methods for reducing inter-node bandwidth consumption are contemplated.

In various embodiments, a computer system includes one or more requester nodes sending transactions to one or more target nodes. A requester node may send transactions configured to read or write storage locations in a target node. In various embodiments, a requester node sends a request to a target node to allocate a register for use by the requester node during the subsequent conveyance of one or more transactions from the requester node to the target node. This request may generally include an address of a memory location in the target node to which a block of data is to be written (e.g., in the case of a write transaction). The requested location may, for example, be a dynamically allocated memory location or a dedicated register.

After receiving the request, the target node determines whether a register is available for use by the requester during the transaction(s). If so, the target node stores the received address in the register and sends a response to the requester node with an identification (ID) of the register. In various embodiments, the requester node subsequently sends one or more transactions in the form of packets to the target node. In various embodiments, each of the packets includes the register ID in place of the address of the memory location being targeted within the target node. The register ID that is used in the packet may generally use fewer bits than the address itself would have used. In some embodiments, the requester node has ownership of a set of registers in the target node. In such a case, the requester node may be guaranteed the use of at least a given number of registers in the target node. These requester-owned registers within the target node may be dedicated registers in a register file, or allocated memory locations, or otherwise. Alternatively, the requester node may not have ownership of any particular registers within the target node. Whether the requester node does or does not have ownership of one or more registers in the target node, if the target node determines no register is available, then the target node sends a response to the requester node with an indication that a register has not been allocated for use by the requester. Following this, the requester node may send another request (i.e., try again). Alternatively, the requester node may send one or more transactions within a packet that includes the address of the memory location in the target node.

After receiving a packet that includes a register ID, the target node uses the register ID to identify the address that corresponds to the transaction. In embodiments where the register is a dedicated register, the register ID may directly identify the dedicated register within a set of registers, such as a register file. In embodiments where the register is a dynamically allocated memory location, the register ID may be mapped to the memory location within the target node.

In various embodiments, the target node determines how the registers are allocated and used by the requester nodes. The target node selects the register based on a variety of resource management schemes. In other embodiments, a switch interposed between the requester node and the target node includes the registers and also determines how the registers are allocated and used. In yet other embodiments, as noted above, the requester node has ownership of a set of registers. These requester-owned registers may be located in the target node or in the switch. In such a case, the requester node may determine how the requester-owned registers within the target node or the switch are allocated and used.

Additionally, in various embodiments, the target node performs arithmetic or logical operations on the memory addresses stored in the registers. For example, the received packet may include an opcode indicating an operation to be performed on the stored memory address. For example, the opcode may indicate performing a pre-increment operation, a post-increment operation, an addition or subtraction with an included offset value, a replacement or substitution of an address subrange with an included operand data value, or otherwise. In various embodiments, operations may alter the state of the address stored in the register either before or after using the address to perform the memory access.

These and other embodiments will be further appreciated upon reference to the following description and drawings. The embodiments described herein may be used by any semiconductor, memory, network, telecom, or other company with interconnects between processors, peripherals, etc. The embodiments may be used for any on-chip, off-chip communication medium.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
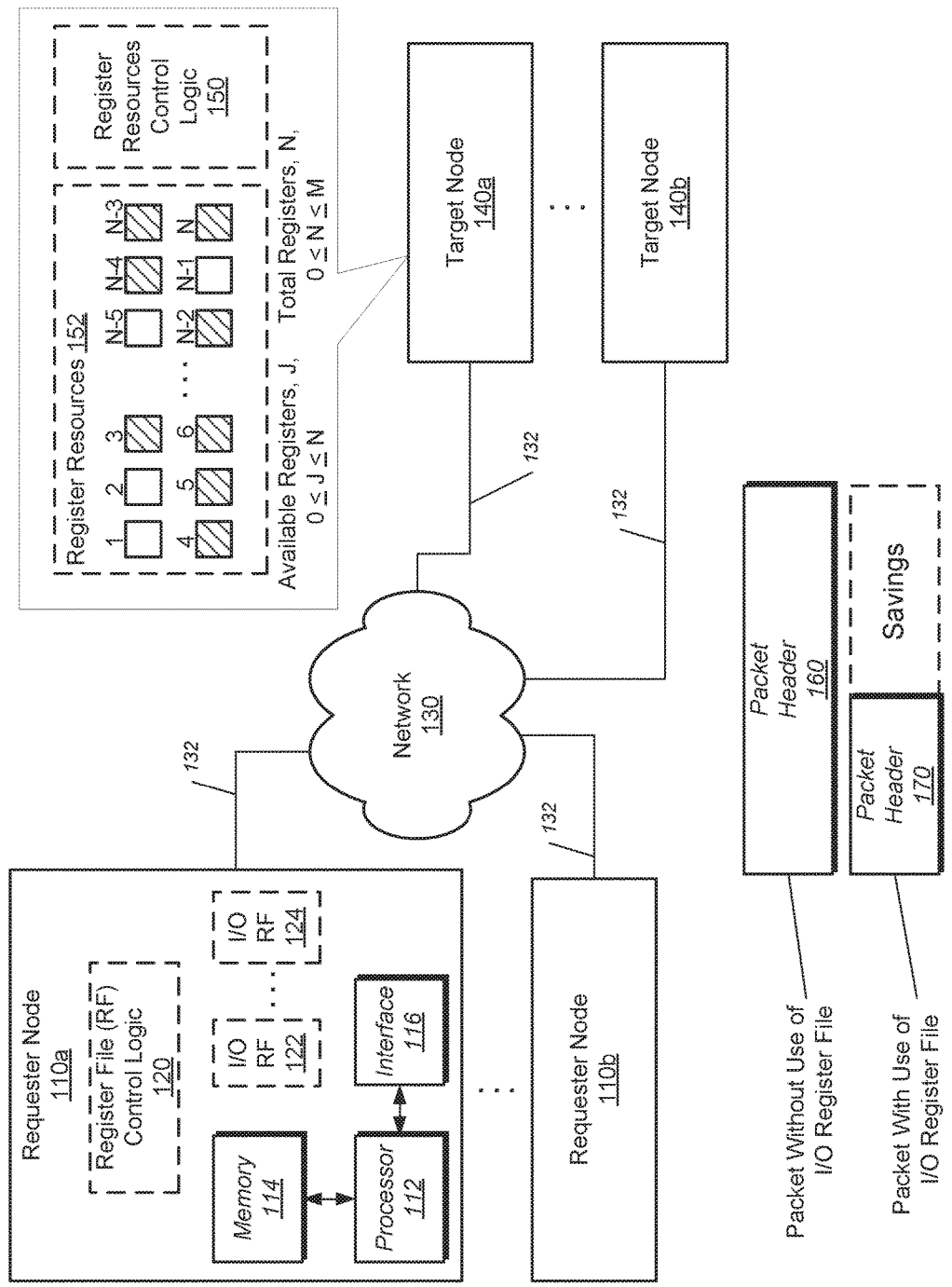
FIG. 1 is a generalized block diagram of one embodiment of a computing system.

Referring to FIG. 1, a generalized block diagram illustrating one embodiment of a computing system is shown. The computing system includes one or more requester (or requesting) nodes 110a-110b and one or more target nodes 140a-140b. Although four nodes are shown in FIG. 1, other embodiments may comprise different numbers of nodes. In addition, the requester nodes 110a-110b may be simultaneously used as target nodes receiving transactions to service from other nodes. Similarly, the target nodes 140a-140b may be used simultaneously as requester nodes generating transactions for other nodes to service.

Nodes 110a-110b and 140a-140b use the network 130 and interconnect links 132 for communication with one another. The communication may include transactions sent between the nodes. The transactions may include read operations for targeted data, write operations for targeted data, requests for statistics or other information, requests to migrate threads or data, and so forth. The transactions being sent may be included in packets. The packets include a header used for routing and processing by the nodes 110a-110b and 140a-140b. Minimizing packet overhead on the interconnect links 132 between the nodes 110a-110b and 140a-140b may increase effective data bandwidth and reduce latency. As used herein, the term "packet" is not intended to be limited to any particular format. Rather, a packet may have any of a variety of formats used for conveying data.

FIG. 1 illustrates an embodiment of a system in which the size of packets being transmitted between nodes may be reduced in size. Each of the nodes 110a-110b and 140a-140b may include processing elements connected to memory. For example, each of the nodes 110a-110b and 140a-140b may be a computing device, such as a desktop computer, a server, a laptop, a tablet computer, a smartphone, and so forth. Alternatively, each of the nodes 110a-110b and 140a-140b may be a computing unit such as a die on a system on a chip (SOC), a processing-in-memory (PIM) node, or otherwise.

In various embodiments, the requester nodes 110a-110b and the target nodes 140a-140b are connected to one another via interconnect links 132 through a network 130 using any of a variety of communication protocols. For example, in an embodiment in which the nodes 110a-110b and 140a-140b are separate computing devices, the network 130 and the interconnect links 132 may utilize network protocols such as the Ethernet, Fibre Channel, a TCP/IP, Wi-Fi connections and so forth. Alternatively, in an embodiment in which the nodes 110a-110b and 140a-140b are separate integrated circuits (ICs), semiconductor dies or PIM nodes within a computing device, the network 130 and the interconnect links 132 may provide point-to-point communication using Peripheral Component Interconnect Express (PCIe), HyperTransport, or RapidIO. These and other protocols and interconnect technologies are possible and are contemplated.

In the example shown, the requester node 110a includes a processor 112, a memory 114 connected to the processor 112 and an interface 116 also connected to the processor 112. Each of the other nodes in the computing system may include similar components. The processor 112 may be one of several known types of processors. For example, the processor 112 may include a general-purpose CPU (central processing unit), a SIMD (single instruction multiple data) processor, GPU (graphics processing unit), a heterogeneous processing unit, or otherwise. In various embodiments, the processor 112 may include one or more processing cores for processing both control software, such as an operating system (OS) and firmware, and software applications that include instructions from one of several types of instruction set architectures (ISAs). The interface 116 may include control logic and buffers or queues used to support communication with other nodes via the network 130 and the interconnect links. The control logic may be implemented in hardware, software, or a combination of hardware and software. The memory 114 may include any suitable memory device. Examples of the memory devices include RAMBUS dynamic random access memories (DRAMs), synchronous DRAMs (SDRAMs), DRAM, static RAM, three-dimensional (3D) integrated DRAM, etc. In other examples, the processor 112 and the memory 114 are combined in processing-in-memory (PIM) nodes.

In various embodiments, an address space of the computing system may be divided among the nodes 110a-110b and 140a-140b. Each of the nodes 110a-110b and 140a-140b may include a memory map, or other data structure, used to determine which addresses are mapped to which system memory, and hence to which one of the nodes 110a-110b and 140a-140b a memory request for a particular address should be routed. In some embodiments, a cache coherency point for an address within the computing system (not shown) is coupled to a memory that stores data corresponding to the address.

As shown in FIG. 1, the target node 140a includes register resources 152 that may be used by requester nodes. In various embodiments, the registers in the register resources 152 may be used to store data values, such as memory addresses, used in packets sent from a requester node(s) 110a-110b. In various embodiments, the register resources 152 may include multiple registers organized in a register file. Alternatively, the register resources 152 may include multiple memory locations organized in an address space in a memory of the target node 140a. In the shown example, the target node 140a includes N registers where N is a non-zero integer. Allocated storage locations are shown as cross-hatched, whereas available registers are shown un-cross-hatched.

At any given time, there may be a given number of registers (J) that are not currently in use and may be allocated for use. In embodiments where the storage locations in the register resources 152 are physical registers or entries in a CAM, the total number of registers (both in use and available for use) is fixed at N. However, in embodiments where the storage locations in the register resources 152 are allocated memory locations in a memory, the total number N of registers may change as memory resources change. For example, the amount of memory available for the register resources 152 may reduce as the memory space of the system memory is provided for other uses. Therefore, the total number N of registers may reduce. Similarly, the amount of memory available for the register resources 152 may increase as the memory space is provided for the register resources 152. Therefore, the total number N of registers may increase. In some embodiments, an upper limit (M) on the number of registers that may be allocated may be established—either programmatically or at a time of manufacture.

The register resources control logic 150 (otherwise referred to as control logic 150) may be used to determine the allocation and deallocation of the registers in the register resources 152. In some embodiments, the control logic 150 is located in interface logic within the target node 140a. In other embodiments, the control logic 150 is located in a memory controller, a processor, or other unit. The control logic 150 may also be configured to manage a table with entries that store register identifiers, an indication as to whether a register is available for allocation, an identification of a requesting nodes making a request for allocation, a transaction ID, and so forth. This table may be referred to as an input/output (I/O) register file (e.g., as depicted in node 110a).

As shown, the requester node 110a includes register file control logic 120 and one or more I/O register files 122-124. Similar to the I/O register file for the target node 140a, each of the I/O register files 122-124 may store information in entries of a table. Each table entry may store one or more of a register ID associated with a register in one of the target nodes 140-140b allocated for storing a given data value, the given data value, an indication identifying the one of the target nodes 140a-140b, a transaction ID and so forth. In some embodiments, the I/O register files 122-124 do not store the given data value stored in an I/O register file for a target node. For example, if a sequence of reads are known to follow a sequence from the programmed register, the reads may be sent one after the other under the assumption that the destination register is being updated correctly according to the operation code.

In various embodiments the requester nodes 110a-110b are configured to send packets (160) that include an address that is the target of a given transaction. Additionally, requester nodes 110a-110b may be configured to send packets (170) that replace the target address with a register identifier (ID) that uses fewer bits in the packet than the address. The register ID identifies a register in the target node that may itself store, or otherwise indicate a location that stores, the replaced address. In addition, packets conveyed by a requester node may indicate an arithmetic operation to perform on a data value stored in an identified registers (e.g., the packet may include an opcode corresponding to a given operation). For example, in embodiments where the register stores a memory address, the opcode in a packet may indicate that the memory address is to be incremented either before (pre) or after (post) the packet is processed. These and other embodiments will be described in greater detail below.

Figure 2:
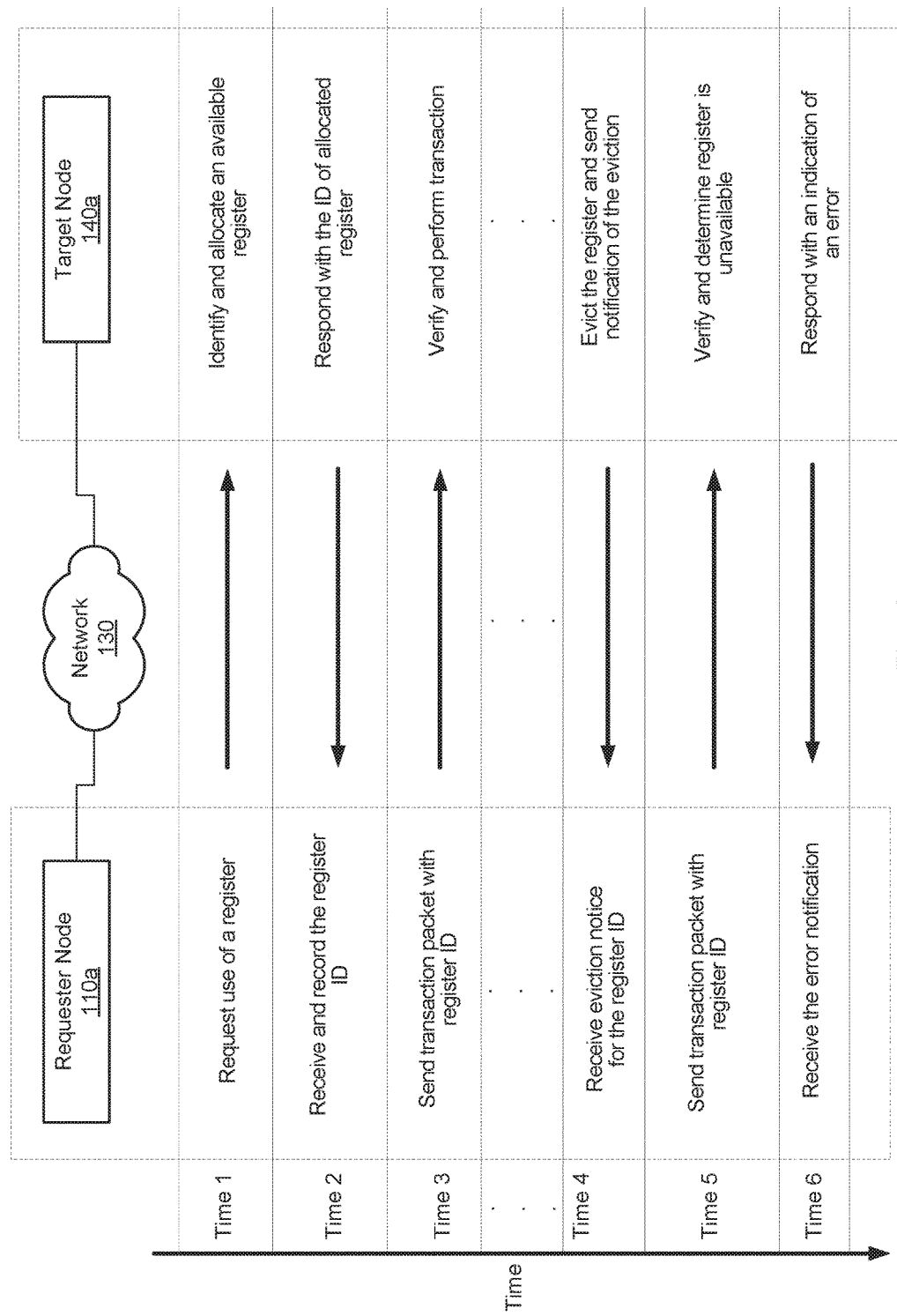
FIG. 2 is a generalized block diagram of one embodiment of a protocol for using input/output (I/O) register files.

Turning now to FIG. 2, one embodiment of a protocol for using input/output (I/O) register files is shown. As shown, a series of events in a time line (top to bottom) may occur between a requester node 110a and a target node 140a. It is noted that while particular events are shown to occur at times 1-6, various other and or different events may also occur that are not illustrated. Additionally, some events could potentially be performed in a different sequence or with at least some concurrency. The events may be performed by control logic within each of the requester node 110a and the target node 140a.

During time 1, the requester node 110a prepares one or more input/output (I/O) transactions that are to be targeted to locations within target node 140a. In various embodiments, the requester node 110a determines one or more addresses for buffered I/O transactions. For example, a series of writes may be performed to addresses within the target node 140a. Control logic associated with the requester node may then determine whether the addresses associated with the I/O transactions exhibit a pattern. For example, the control logic may analyze the buffered I/O transactions to determine if they exhibit a sequential pattern, a pattern with a given stride, or some other discernible pattern. The requester node 110a may then send a request for allocation of a register in the target node 140a. The target node 140a receives the request and determines whether an available register exists. If so, an available register is selected for allocation to the requester and an address identified by the request (e.g., a base address for a block of writes) is stored in the allocated register. Additionally, the target node 140a may store an indication that the allocated register has now been allocated for use and is not currently available. In addition, other information that may be stored by the target node includes one or more of an indication identifying the requesting node 110a to which the register has been allocated, a transaction ID, and so forth. In various embodiments, this information may be stored in an entry of an I/O register file.

At time 2, the target node 140a sends a response to the requester node indicating successful allocation of a register and the corresponding register ID. The requester node 110a receives the response and stores the register ID (e.g., in one of its I/O register file). At time 3, the requester node 110a sends an I/O transaction (e.g., that was buffered earlier). When sending the I/O transaction, the requester node 110a does not include an address for the packet representing a target of the transaction. Rather, the requester node includes the received register ID. In addition, in some embodiments the requester node 110a may also include an indication of an arithmetic operation to be performed on the value stored in the register. This opcode is separate from an indication as to whether the I/O transaction corresponds to a read operation, a write operation, an information gathering request, and so forth. For example, the opcode in the packet may indicate the address stored in the register is to be incremented after (or before) data included in the packet is written to a memory location identified by the register. The increment amount may be encoded in the opcode, such as an increment by a known block size. A cache line is one example of the known block size. Other examples are possible and contemplated.

In addition to the register ID and the opcode, in some embodiments the requester node 110a may include operand data in the packet data. For example, an increment value or stride value may be sent as operand data. Alternatively, the operand data may be a new value that is to be used to replace a current value stored in the register. Therefore, when the requester node 110*a* sends subsequent packets for the I/O transactions, the register may not necessarily store the same value that was conveyed with the original request from the requester node. Rather, the target node may automatically change (e.g., increment, apply stride value, etc.) the address stored in the register after each packet is received by the target node. In such a manner, the received data (or conversely received read requests) will be associated with a correct address stored in the register.

When the target node 140*a* receives the packet, it may process it immediately or buffer it for processing at a later time. Upon verifying the desired transaction identified by the packet, the target node 140*a* processes the information in the packet and performs the operation in the packet. Verification may include determining the identified register is allocated to the requesting node, and so on. Performing the operation may include generating an I/O transaction with an address created from the data stored in the specified register. For example, the transaction may be targeted to a device or component that is configured to process packets and or transactions that conform to a particular format. Such format may include a header with an address that is a target of the transaction. Because the packet received from the requester node may not conform to such a format (e.g., the address was replaced with a register identifier, a new opcode was added, etc.), the component cannot process the packets. To remedy this, the target node is configured to generate I/O transactions that conform to the expected format(s) by using the received packets and an address created from the data stored in the specified register. In this manner, other components within the system may proceed with processing of the transactions without the need for new or modified hardware and/or software.

In addition to the above, the target node 140*a* may also determine as needed that one or more registers are to be deallocated in order to allow allocation for other processes or other requester nodes. Selection of which register(s) to deallocate may be based on any of a variety of conditions. For example, the target node 140*a* may select registers to deallocate based on priority levels associated with transactions or values stored in the registers. The target node 140*a* may also select registers to deallocate based on the sizes of the addresses stored in the registers. For example, registers storing smaller addresses may be deallocated first. The target node 140 may also use a least-recently-used (LRU) algorithm for selecting registers to deallocate. These and other conditions and combinations of conditions may be used for selecting registers to deallocate.

In some embodiments, a requester node will convey an indication (either explicitly or implicitly) that is no longer needs use of an allocated register. In response to detecting or determining this, the target node may deallocate the previously allocated register. In other embodiments, at some point in time (e.g., time 4) the target node 140*a* may determine that the register allocated in time 1 is to be deallocated without having received any notification from the requester node 110*a*. In some cases, the requester node 110*a* may not be finished using the register at the time the target node decides to deallocate the register. In such a case, the requester node 110*a* may receive an eviction notice from the target node. Having lost the use of the register, the requester node 110*a* may finish processing I/O transactions associated with the register by sending packets with the necessary address included in the packet(s). Alternatively, the requester node 110*a* may decide to repeat time 1 and request another register to use in the target node 140*a*. This decision by the requester node may be based on variety of factors such as a number of remaining I/O transactions to process. For example, if a relatively large number of transactions remain. Then the saving in overhead by using the register ID based approach may be deemed worth a return to time 1. In various embodiments, the requester node 110*a* may keep track of each unacknowledged pending transaction. Therefore, the requester node 110*a* is able to identify transactions that may need to be retried—such as after a given time interval or after another qualifying condition.

In time 5, should the requester node 110*a* send a packet using a register ID associated with a register that has been evicted in the target node 140*a*, the target node 140*a* may detect the eviction during the verification process. For example, the requester node 110*a* may have inadvertently sent the packet before fully processing the earlier received notice of eviction. Alternatively, the requester node 110*a* may have sent the packet even before the target node 140*a* was able to send notification of the eviction of the associated register. In time 6, the target node 140*a* sends a packet with an indication of the error. The error may be due to attempting to access an evicted register or due to attempting to access a register now owned by another process or another requester node.

Figure 3:
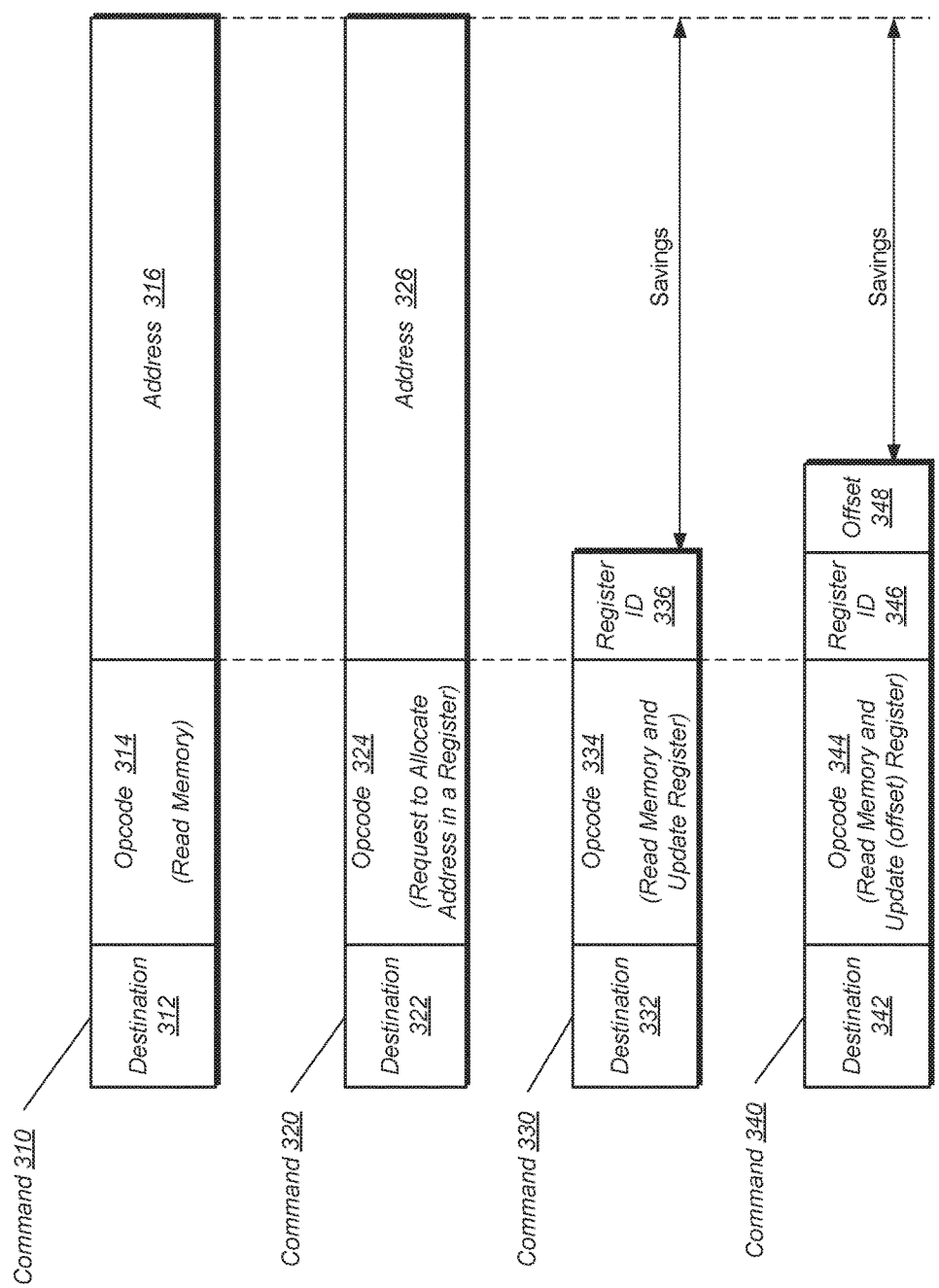
FIG. 3 is a generalized block diagram of one embodiment of commands to include in the packets between requester nodes and target nodes.

Referring now to FIG. 3, a generalized block diagram of one embodiment of commands that may be included in the packets between requester nodes and target nodes is shown. Although the fields in the commands are shown as being stored in a contiguous manner and stored in a particular order, the placement of the fields may differ from the examples shown in FIG. 3. Additionally, other fields may be stored in the packet that are not shown in the examples in FIG. 3. For example, an indication of a transaction, a virtual channel and so on may also be stored in the packet with one or more of the commands 310-340. Further, a transaction ID may be used to match responses with processed transactions that were previously sent. A virtual channel ID may be used to identify a given virtual channel so as to maintain predetermined assignments and relieve or prevent channel congestion. Other fields to include in the packet are possible and are contemplated.

The command 310 may be used to read a memory location in a target node. The command 310 includes a destination field 312 indicating the target node for receiving the packet. The opcode field 314 indicates the operation to perform is to read a memory location. The address 316 indicates the address of the memory location to read. As shown, the commands 320, 330 and 340 also include a destination field 322, 332 and 342. Similar to the destination field 312, these fields store information used to identify the target node that is to receive and process the packet.

The command 320 is used to request allocation of a register in the target node (e.g., for storing a data value, such as a base address, as discussed above). The opcode field 324 indicates this request. In some embodiments, the field 326 indicates the base address used to store in an allocated register. In other embodiments, the field 326 may indicate data values other than a base address to store in an allocated register in the specified target node.

The command 330 is used to read a memory location in the specified target node and update the address stored in the register identified by field 336. The opcode field 334 indicates this request and the type of update to be performed. For example, in some embodiments, the indicated update may be a pre-processing increment or decrement operation. In other embodiments, the indicated update is a post-processing increment or decrement operation. The field 336 may store an indication of the register to use in the specified target node. For example, a register ID may be stored in the field 336. Other forms of indicating the register may also be used. It is noted that the field 336 may use a smaller number of bits than fields 316 and 326 used to indicate an address in the target node. Using a smaller number of bits may reduce the packet overhead. Reducing packet overhead may, in turn, increase available data bandwidth and reduce latency on the interconnect links between the requester node and the target node.

The command 340 is used to request a read of a memory location in the specified target node and update the address based on a specified offset. The opcode field 344 indicates this request. Similar to the field 336 in the command 330, the field 346 in the command 340 may store an indication of the register to use in the specified target node. The field 348 may store an indication of the offset to use for the update indicated by the field 344. The update may be a pre-processing update of the data value, such as an address. Alternatively, the update may be a post-processing update of the data value stored in the register. With the offset, in some embodiments, the update adds a stride value to an address associated with the read operation. Alternatively, the update subtracts a stride value from the address. Many other types of updates using an offset are possible and contemplated.

It is noted that the commands 330-340 may be modified to create memory write requests. An additional field may be used to store an indication of the write data to use for modifying a memory location in the specified target node. However, the write operations would still use the fields 336 and 346 in place of using the address of the target write locations.

Figure 4:
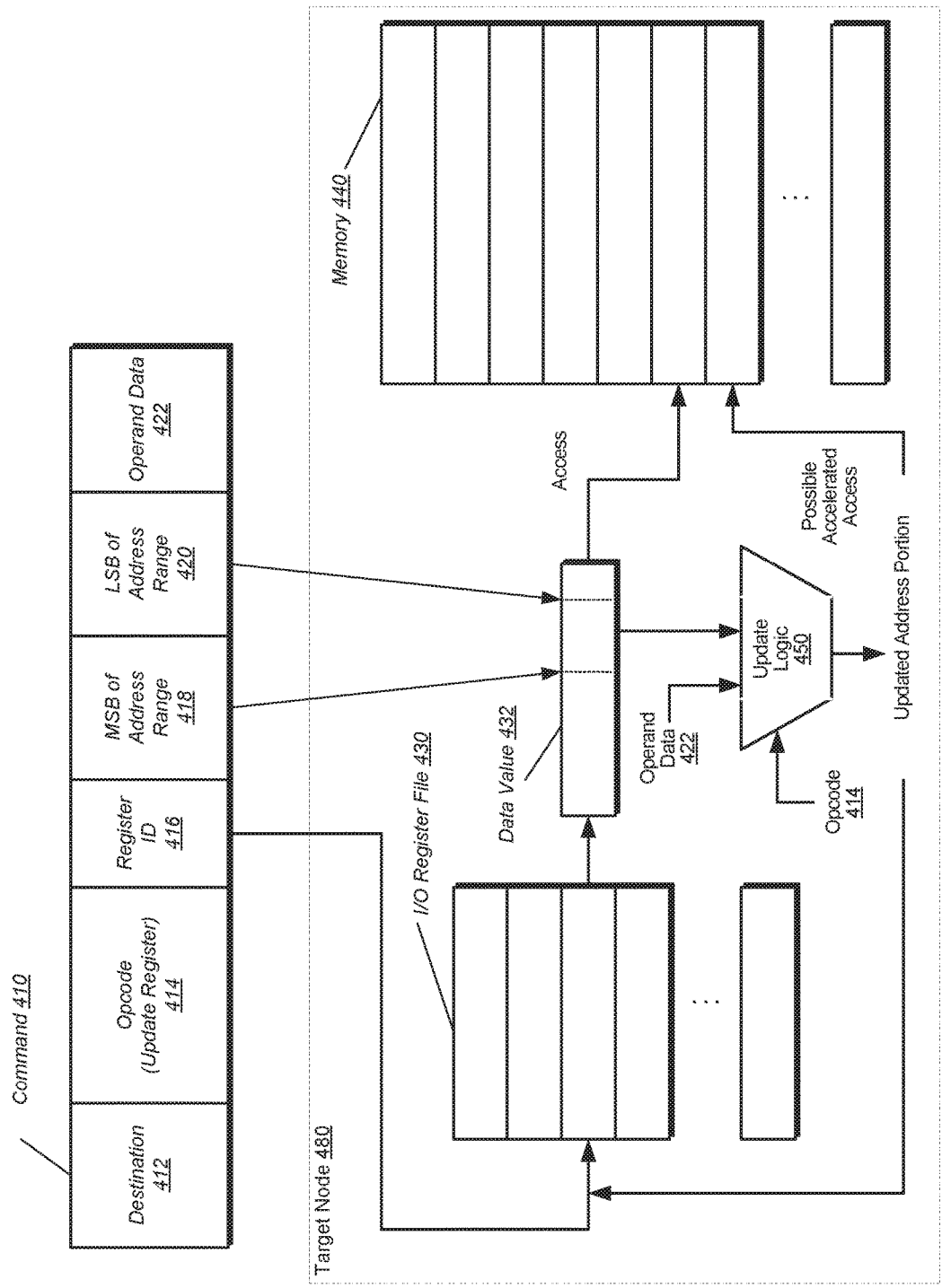
FIG. 4 is a generalized block diagram of another embodiment of commands to include in the packets between requester nodes and target nodes.

Turning now to FIG. 4, a generalized block diagram of a command 410 and target node 480 is shown. As shown, target node 480 includes at least an input/output (I/O) register file 430, a memory 440, and update logic 450. Other control logic is not shown for ease of illustration. In addition, the command 410 may represent a command within a packet sent from a requestor node to the target node 480. As described earlier, the target node receives the packet, verifies the packet, and processes the information in the packet.

In the embodiment shown, allocated registers in the I/O register file 430 are configured to store data values. In various embodiments, these data values are addresses used to access the memory 440. The target node 480 may change a data value stored in a particular allocated register of the I/O register file 430 based on the information stored in the received command 410. In the example shown, the received command 410 includes the fields 412-422. Although the fields 412-422 in the command 410 are shown as being stored in a contiguous manner and stored in a particular order, the placement of the fields may differ from the example shown in FIG. 4. Similar to the examples in FIG. 3, the packet that includes the command 410 may include other fields that are not shown.

The command 410 may be used to update a data value stored in a particular allocated register in the I/O register file 430 of the target node 480. The destination field 412 may store an identification of the target node where the particular register is located. The opcode field 414 may store an indication of the type of update to perform on the data value stored in the particular register.

The field 416 may store an identification of the particular register to use (e.g., in the I/O register file 430) in the specified target node 480. For example, a register ID may be stored in the field 416. Other forms of indicating the register may also be used. As shown in the example, the stored identification may be used to index into the I/O register file 430 in the specified target node 480. In some embodiments, the indication stored in the field 416 may be used to directly index into the I/O register file 430. In other embodiments, the information stored in the field 416 may be used to access one or more mapping tables to provide a value to index into the I/O register file 430 (there may be one or more levels of indirection). It is noted that the field 416 may use fewer bits than would otherwise be used for storing a target address.

The fields 418 and 420 may be used to store indications of a range of the data value stored in the particular register to update. For example, in some embodiments, the data value stored in the particular register is an address, and the fields 418 and 420 may respectively store an indication of a most-significant bit of an address range and the least-significant bit of an address range. As shown, the fields 418 and 420 are used to identify a portion or range of the data value 432 stored in a particular register of the I/O register file 430. The field 422 may store an indication of the operand data to combine with the range of the data value 432 specified by fields 418 and 420. As shown, update logic 450 may receive the specified range of the data value 432, the operand data from field 422, and the opcode from field 414. Many different types of operations may be indicated by the opcode in the field 414 for combining the range of the data value 432 and the operand data in the field 422. For example, the opcode in the field 414 may indicate operations such as incrementing, decrementing, applying stride value, applying a Boolean operation, or otherwise.

Updating the data value 432 stored in the register in the I/O register file 430 may occur prior to using the data value 432. Alternatively, updating the data value 432 stored in the register in the I/O register file 430 may occur after using the data value 432. In embodiments where the data value 432 is an address, the update of the address range may be performed prior to accessing the memory 440 with the address 432. Alternatively, the update of the address range may be performed after accessing the memory 440 with the address 432. The updated portion of the data value 432 generated by the update logic 450 may be concatenated with the unchanged portions of the data value to provide the full changed data value. In embodiments where the data value 432 is an address, the updated address portion may be concatenated with the unchanged address portions to provide a full updated address. As shown, the changed data value may be stored in the particular register of the I/O register file 430 for use by a subsequent I/O transaction. In addition, the changed data value may be used for a possible accelerated access of the memory 440. For example, data from the memory 440 may be prefetched using the changed data value and stored for later use.

Figure 5:
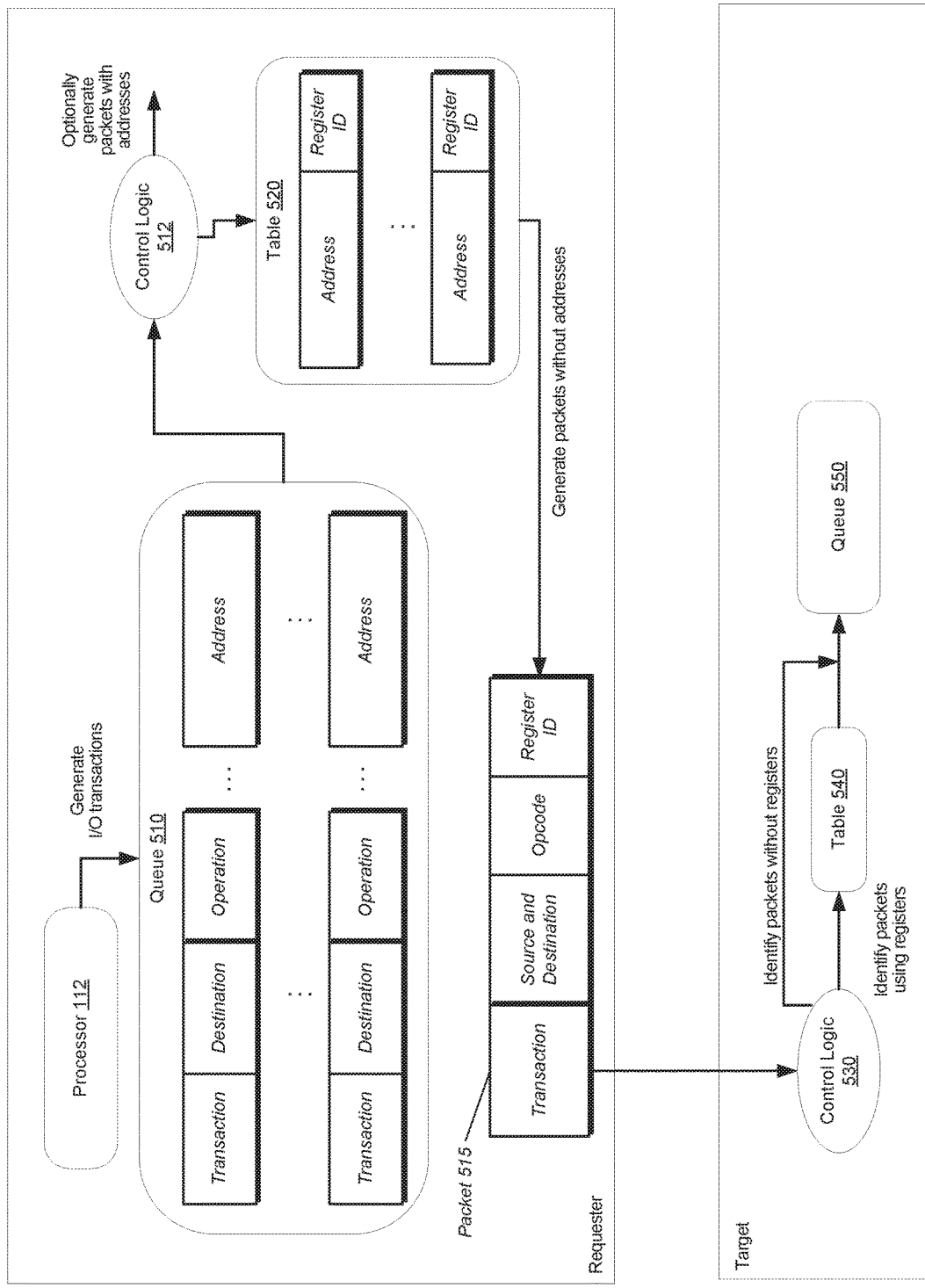
FIG. 5 is a generalized block diagram of one embodiment of transmitting packets with reduced packet overhead.

Referring now to FIG. 5, a block diagram of one embodiment for sending packets with reduced packet overhead is shown. As shown, a processor 112 in a requester node generates I/O transactions which may then be stored in a queue (or buffer) 510. The queue 510 may be include multiple entries for storing information associated with I/O transactions. Each entry may store indications that identify an I/O transaction, a destination (target node), an indication of an operation corresponding to the I/O transaction, and an address of a memory location in the target node. Other indicators may also be stored in each entry in the queue 510 indicating a valid status, one or more timestamps, a priority level, and so forth.

The control logic 512 may determine whether or not a given I/O transaction in the queue 510 should be processed with reduced packet overhead. Many factors may be used by the control logic 512 to make such a determination. Some of these factors may include whether allocation of a register in an I/O register file of the target node was successfully completed, whether the target node sent notification of an eviction of the register, a number of I/O transactions corresponding to a same transaction identifier (ID), and so on.

In various embodiments, a table 520 is used to store mappings between memory addresses and register IDs of registers that have been allocated in target nodes. Other information may also be stored in the table 520. In some embodiments, a data value other than a memory address is stored in the table 520. For example, a pointer may be stored to a corresponding entry in the queue 510. As registers are requested and allocated in the target node, the table 520 may be updated. Similarly, as registers are deallocated or evicted, the table 520 may be appropriately updated. In some embodiments, the information stored in the queue 510 and the table 520 may be combined to form an I/O register file. Alternatively, the information is stored in physically separate locations, but the information forms entries in a logical I/O register file.

Generally speaking, the information stored in the queue 510 and the table 520 may be used to form packets, such as packet 515, with reduced overhead. Such packets may include an identification of an I/O transaction, a requester node (source), a target node (destination), an operation of the I/O transaction, a register ID, and possibly fields described earlier for the commands 310-340 and command 410. By excluding a target address from the packet, the packet has a reduced size as it is sent across interconnect links to the target node.

When the target node receives a packet, control logic 530 in the target node determines whether or not the received packet should be processed as a reduced overhead packet. In various embodiments, an indication may be included in the packet to aid in making this determination. Similar to table 520 in the requester node, the table 540 in the target node stores a mapping between addresses and register IDs. Other information stored in the table 540 may include one or more of an indication of a corresponding requester node (owner), a priority level, a size of the address or other stored data value, a LRU value, an indication identifying the I/O transaction or task, and so forth. The queue 550 may store information similar to the queue 510, but include identification of requester nodes (sources) rather than the target node (destination). As with queue 510 and table 520, queue 550 and the table 540 may be combined in various ways. It is noted that in some embodiments, blocks 530-550 may be located in a component (e.g., a switch) between the requester node and the target node, rather than located in the target node. By placing the functionality of the blocks 530-550 in the switch, the end nodes acting as target nodes may not need to be redesigned to support the maintenance of the I/O register files.

Figure 6:
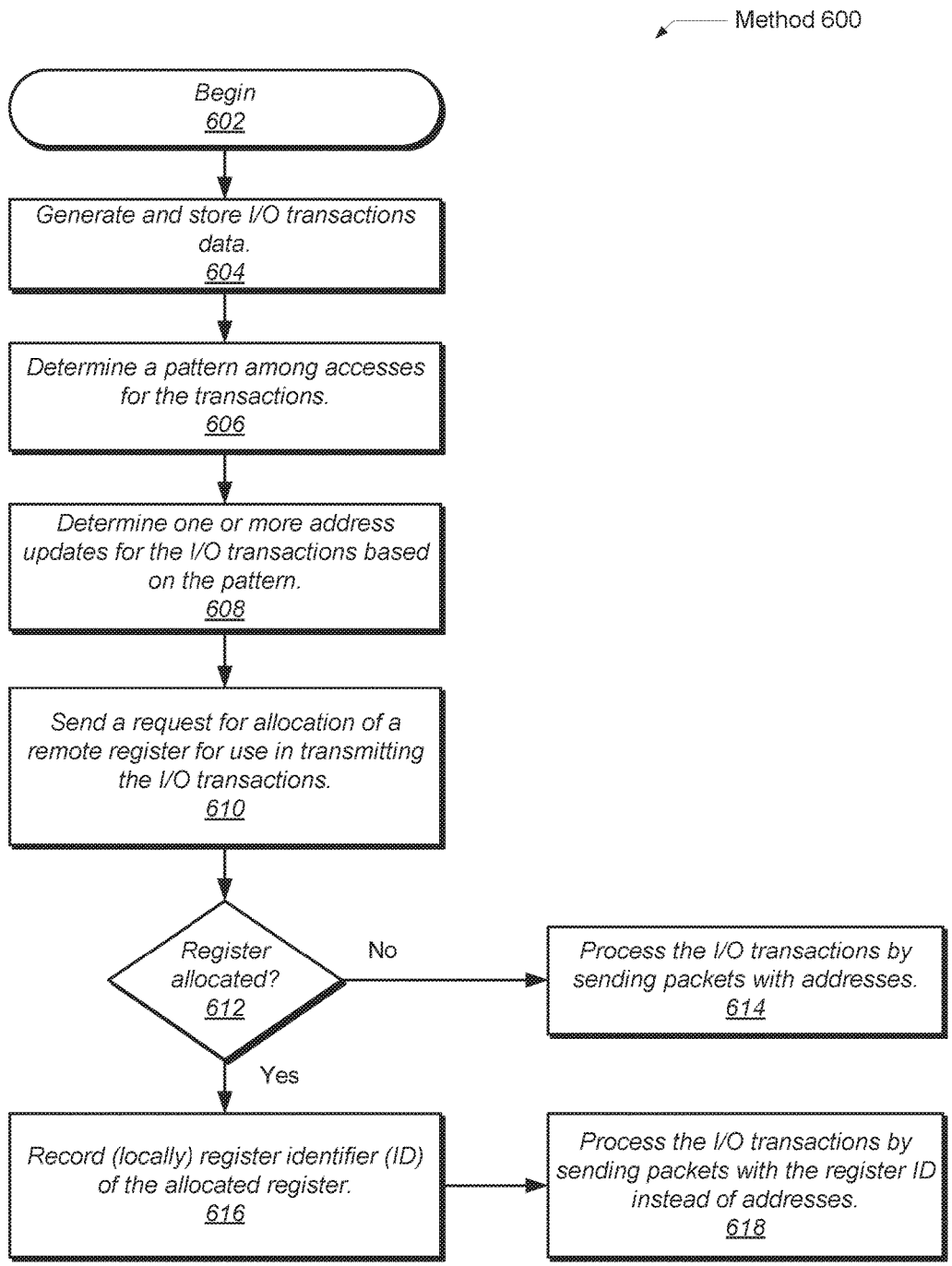
FIG. 6 is a generalized flow diagram illustrating one embodiment of a method for transmitting packets with reduced packet overhead.

Turning now to FIG. 6, one embodiment of a method 600 for transmitting packets with reduced packet overhead is shown. For purposes of discussion, the steps in this embodiment are shown in sequential order. It should be noted that in various embodiments of the method described below, and other methods described herein, one or more of the elements described may be performed concurrently, in a different order than shown, or may be omitted entirely. Other additional elements may also be performed as desired. Any of the various nodes, apparatuses, or systems described herein may be configured to implement method 600.

Input/output (I/O) bandwidth reduction begins in block 602 as the processing elements, such as one or more processors, in a requester node generates I/O transactions to send to an external target node. In block 604, the requester node stores data corresponding to the multiple I/O transactions. In block 606, the requester node determines a pattern among the memory accesses corresponding to the multiple I/O transactions. In other embodiments, a compiler may detect patterns among the memory accesses. In yet other embodiments, another off-chip hardware component such as an off-chip memory controller or control logic in a switch may detect the pattern and send a corresponding indication to the requester node. In block 608, the requester node determines one or more address updates for the I/O transactions based on the pattern.

In block 610, the requester node sends a request for allocation of a remote register for the multiple I/O transactions. If a successful response is not received for the request from the remote location (conditional block 612), then in block 614 the requester node processes the transactions by sending packets with addresses identifying a target for each packet sent. Otherwise, if a successful response is received (conditional block 612), then in block 616 the requester node locally records an identifier (ID) of the allocated register. In block 618, the requester node then processes the I/O transactions by sending packets with the register ID and indications of the address updates rather than target addresses. In some embodiments, the requester node has ownership of a set of registers. These requester-owned registers are located in a target node or in a switch. In such a case, the requester node determines how the requester-owned registers within the target node or the switch are allocated and used. Therefore, in these cases, the requester node may use steps 610 and 618 in the above method while skipping the intermediate steps 612-616.

Figure 7:
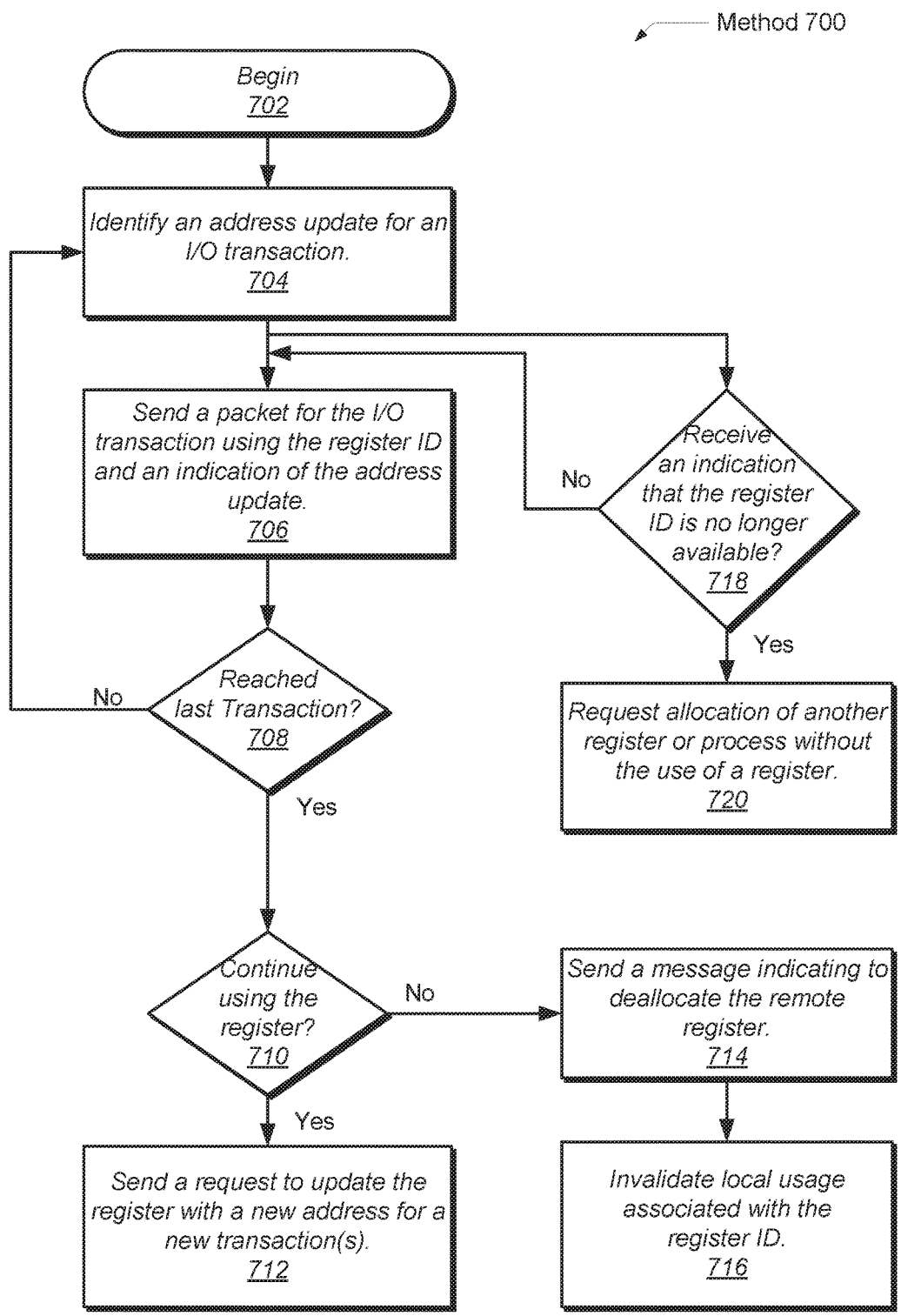
FIG. 7 is a generalized flow diagram illustrating another embodiment of a method for transmitting packets with reduced packet overhead.

Turning now to FIG. 7, one embodiment of a method 700 for transmitting packets with reduced packet overhead is shown. Any of the various nodes, apparatuses, or systems described herein may be configured to implement method 700. Processing I/O transactions with the register ID begins in block 702. In block 704, the requester node identifies an address update for a transaction of the multiple transactions. In block 706, the requester node sends a packet for the I/O transaction using the register ID in place of an associated memory address. The packet also includes an indication of an address update. If the last I/O transaction has not been reached (conditional block 708), then method 700 returns to block 704. If the last I/O transaction has been reached (conditional block 708), then the requester determines whether to use the same remote register for other subsequent I/O transactions. In other words, the original request for allocation of a register may have been for a given transaction (s). Upon completion of the given transaction(s), the requester could give up the allocated register and repeat the process by requesting a new register. Alternatively, if the requester now has other transactions to process, it may simply continue using the previously allocated register. If the requester node decides to continue to use the same remote register (conditional block 710), then in block 712 the requester node may send a request to update the register with a different address that corresponds to the new transaction(s). If the requester node decides not to continue using the same remote register (conditional block 710), then in block 714 the requester node may sends a message indicating the remote register may be deallocated and the requester node invalidates local usage associated with the register ID (block 716). For example, the requester node may invalidate entries in a local I/O register file and other data structures storing the register ID.

During processing of packets, the requester node may receive an indication from the target node that the register associated with the register ID is no longer available. This indication may be an asynchronous indication. If such an indication is received (conditional block 718), then in block 720 the requester node either requests allocation of another register or processes the remaining I/O transactions without the use of a remote register.

Figure 8:
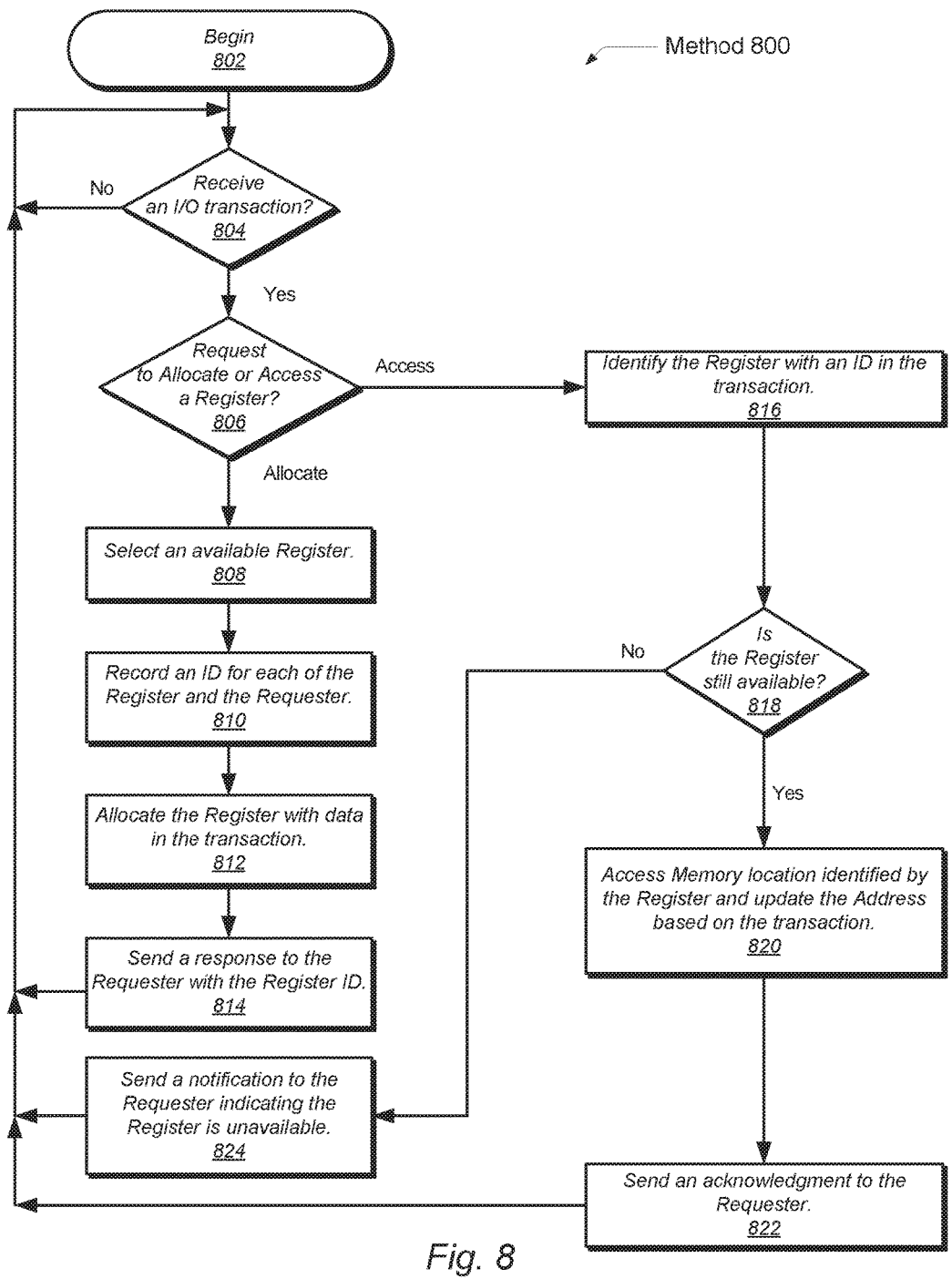
FIG. 8 is a generalized flow diagram illustrating yet another embodiment of a method for transmitting packets with reduced packet overhead.

Turning now to FIG. 8, another embodiment of a method 800 for transmitting packets with reduced packet overhead is shown. Any of the various nodes, apparatuses, or systems described herein may be configured to implement method 800. Reducing input/output (I/O) bandwidth consumption begins in block 802. If a target node receives an I/O transaction (conditional block 804), and the I/O transaction requests allocation of a register (conditional block 806), then in block 808 the target node selects an available register. In block 810, the target node records an identifier (ID) for the identified register and an indication of the requester node that sent the I/O transaction requesting allocation. Alternatively, an index or position of the identified register in the register file may be stored. In block 812, the target node allocates the selected register with a data value that was received in the allocation request. In various embodiments, the data value is a memory address. In block 814, the target node sends a response including the register ID to the requester node indicating successful allocation. Subsequently, the method 800 returns to conditional block 804.

If the I/O transaction requests to access a register (conditional block 806), then in block 816 the target node identifies the register with an indication included in the transaction. In various embodiments, the indication in the request may be a register identifier (ID). If the identified register is not available (conditional block 818), then in block 824 the target node sends a notification to the requester node that the register is not available. The notification may indicate that the data stored in the register has been evicted. Afterward, the method 800 returns to the conditional block 804.

If the identified register is still available (conditional block 818), then in block 820 the target node accesses a memory location identified by the register. The target node may also update the memory address based on an opcode and other update information in the received transaction or received packet. In block 822, the target node may send an acknowledgment to the requestor node indicating the transaction has been processed.

Figure 9:
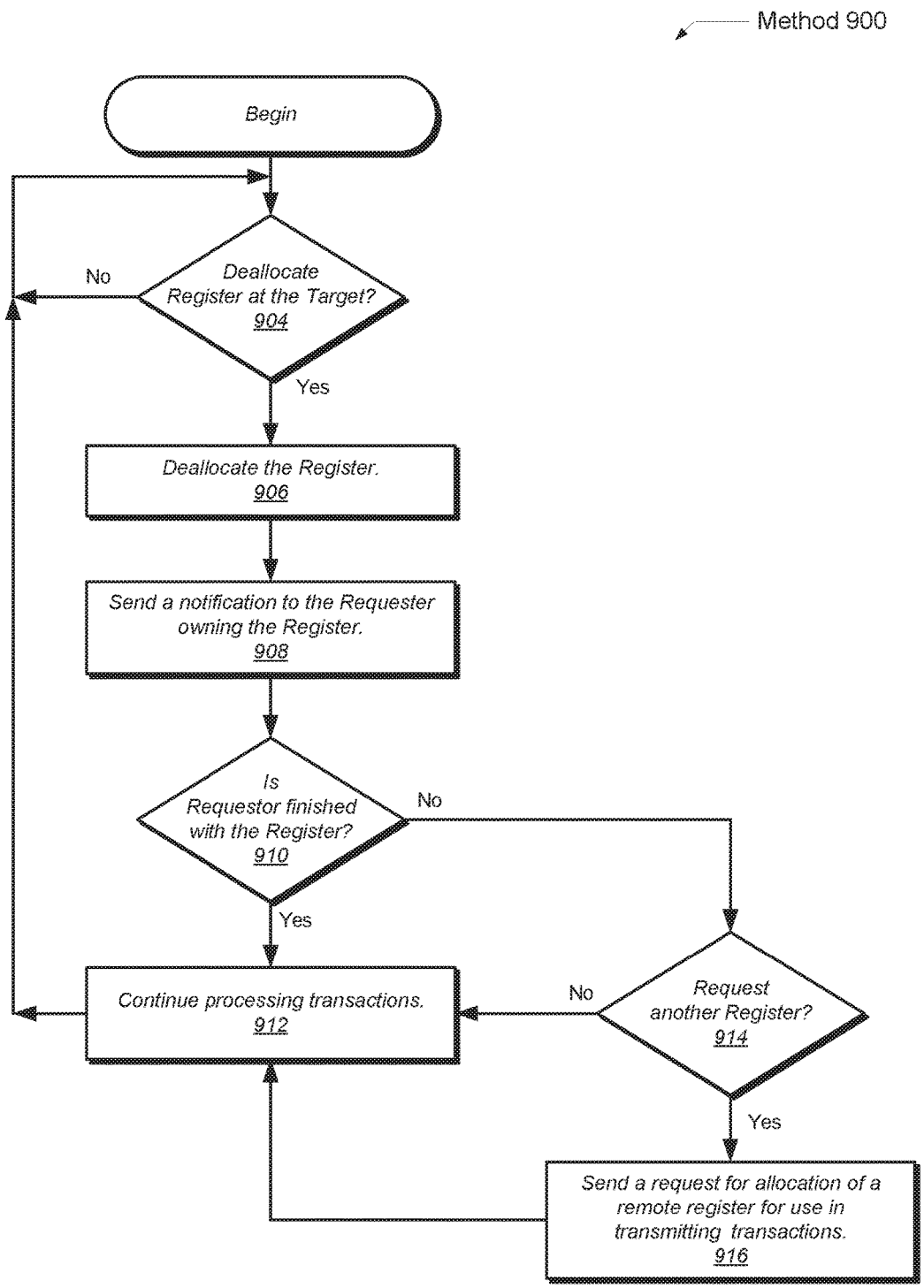
FIG. 9 is a generalized flow diagram illustrating yet another embodiment of a method for transmitting packets with reduced packet overhead.

Turning now to FIG. 9, another embodiment of a method 900 for processing packets with reduced packet overhead is shown. Any of the various nodes, apparatuses, or systems described herein may be configured to implement method 800. A requestor node generates transactions to send to a target node as described earlier with the use of a register identifier (ID) identifying a remote register for use in transmitting I/O transactions. During the processing of the received transactions, or at other times, the target node may determine an allocated register is to be deallocated. As described earlier, the target node may determine that the register is to be deallocated without having received any notification from the requester node. If the target node determines an allocated register is to be deallocated (conditional block 904), then in block 906 the target node deallocates the register. In block 908, the target node sends a notification indicating the register has been deallocated to the requester node identified as the node that was using the register. This notification may be an asynchronous notification.

If the requestor node is finished using the register identified in the received notification (conditional block 910), then in block 912 the requestor node continues processing transactions and control flow of method 900 returns to conditional block 904. If the requestor node is not finished using the register identified in the received notification (conditional block 910), then the requestor node determines whether it will request use of another register to continue the transactions (conditional block 914). If the requester node does not request another register (conditional block 914), the method continues with block 912. If the requestor node does determine to request another remote register to finish processing one or more transactions (conditional block 914), then in block 916 the requester node sends a request to the target node for allocation of a remote register for one or more I/O transactions. If a successful response is not received for the request from the target node, then the requester node processes the transactions by sending packets with addresses identifying a target memory location for each packet sent. Otherwise, if a successful response is received, then the requester node locally records an identifier (ID) of the allocated register. The requester node then processes the I/O transactions by sending packets with the register ID and indications of the address updates rather than sending packets with target addresses as generally described in FIG. 8.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   sending from a requesting node, the requesting node comprising a processor and a network interface, to a target node via a computing network a request to allocate a register in a register file for use in the target node during one or more subsequent transactions to be conveyed from the requesting node to the target node, the request including an address of a memory location in a memory device in the target node;
   receiving, via the computing network, by the requesting node a response to the request from the target node;
   generating a packet comprising data that corresponds to a given transaction of the one or more subsequent transactions, wherein:
      the packet comprises an address of the given memory location in the target node when the response indicates a register has not been allocated for use; and the packet comprises a register identification (ID) of a register that was allocated in the target node instead of the address of the given memory location when the response indicates the register has been allocated for use by the requesting node; and sending, via the computing network, the packet that corresponds to a given transaction of the one or more subsequent transactions from the requesting node to the target node targeting the memory location in the memory device.

2. The method as recited in claim 1, further comprising the target node:

receiving the request to allocate a register;

responsive to determining a register is available, storing the address of the given memory location in the register and sending the register ID to the requesting node; and responsive to determining a register is not available, sending a response to the requesting node that indicates a register has not been allocated for use by the requesting node.

3. The method as recited in claim 2, further comprising:

receiving the packet at the target node;

utilizing the register ID to access the register and identify the address of the given memory location that corresponds to the transaction; and utilizing the address of the given memory location stored in the register to access the memory device in order to service the transaction.

4. The method as recited in claim 1, wherein the register identification is usable by the target node to access the register and identify the address of the given memory location that corresponds to the transaction.

5. The method as recited in claim 1, wherein the packet comprises an opcode that indicates an operation to perform on an address stored in the register.

6. The method as recited in claim 1, further comprising the target node maintaining a mapping of the register ID to the address of the given memory location and automatically incrementing the address of the given memory location that is stored in the register responsive to receiving a transaction of the one or more transactions, wherein a value stored in the register identifies a target memory location of a transaction received from the requesting node.

7. A computing system comprising:

a requesting node comprising a processor and a network interface;

a computing network; and a target node coupled to the requesting node via the computing network;

wherein the requesting node is configured to:

send to the target node, via the computing network, a request to allocate a register in a register file for use in the target node during one or more subsequent transactions to be conveyed from the requesting node to the target node, the request including an address of a memory location in a memory device in the target node;

receive, via the computing network, a response to the request from the target node;

generate a packet comprising data that corresponds to a given transaction of the one or more subsequent transactions, wherein:

the packet comprises an address of the given memory location in the target node when the response indicates a register has not been allocated for use; and the packet comprises a register identification of a register that was allocated in the target node instead of the address of the given memory location when the response indicates the register has been allocated for use by the requesting node; and send, via the computing network, the packet that corresponds to a given transaction of the one or more subsequent transactions from the requesting node to the target node targeting the memory location in the memory device.

8. The computing system as recited in claim 7, wherein the target node is configured to:

receive the request to allocate a register;

responsive to determining a register is available, store the address of the given memory location in the register and send the register ID to the requesting node; and responsive to determining a register is not available, send a response to the requesting node that indicates a register has not been allocated for use by the requesting node.

9. The computing system as recited in claim 8, wherein the target node is further configured to:

receive the packet;

utilize the register ID to access the register and identify the address of the given memory location that corresponds to the transaction; and utilize the address of the given memory location stored in the register to access the memory device in order to service the transaction.

10. The computing system as recited in claim 7, wherein the register ID is usable by the target node to access the register and identify the address of the given memory location that corresponds to the transaction.

11. The computing system as recited in claim 7, wherein the packet comprises an opcode that indicates an operation to perform on an address stored in the register.

12. The computing system as recited in claim 7, wherein the target node is further configured to maintain a mapping of the register ID to the address of the given memory location and automatically increment the address of the given memory location that is stored in the register responsive to receiving a transaction from the requesting node, wherein a value stored in the register identifies a target memory location of a transaction received from the requesting node.

13. The computing system as recited in claim 11, wherein the opcode indicates one of an addition operation, a subtraction operation and a substitution operation.

14. The computing system as recited in claim 8, wherein the target node is further configured to deallocate the register previously allocated for the requesting node based on one or more of a priority level and a least-recently-used (LRU) value for the memory address stored in the register.

15. A non-transitory computer readable storage medium storing program instructions, wherein the program instructions are executable by a processor to:

send from a requesting node, the requesting node comprising a processor and a network interface, to a target node via a computing network a request to allocate a register in a register file for use in the target node by the requesting node during one or more subsequent transactions to be conveyed from the requesting node to the target node, the request including an address of a memory location in a memory device in the target node;

receive, via the computing network, a response to the request from the target node;

generate a packet comprising data that corresponds to a given transaction of the one or more subsequent transactions, wherein:
- the packet comprises an address of the given memory location in the target node when the response indicates a register has not been allocated for use; and
- the packet comprises a register identification of a register that was allocated in the target node instead of the address of the given memory location when the response indicates the register has been allocated for use by the requesting node; and send, via the computing network, the packet that corresponds to a given transaction of the one or more subsequent transactions from the requesting node to the target node targeting the memory location in the memory device.

16. The non-transitory computer readable storage medium as recited in claim 15, wherein the program instructions are further executable by a processor to:
receive the request to allocate a register;
responsive to determining a register is available, store the address of the given memory location in the register and send the register ID to the requesting node; and
responsive to determining a register is not available, send to the requesting node a response that indicates a register has not been allocated for use by the requesting node.

17. The non-transitory computer readable storage medium as recited in claim 16, wherein the program instructions are further executable by a processor to:
receive the packet at the target node;
utilize the register ID to access the register and identify the address of the given memory location that corresponds to the transaction; and
utilize the address of the given memory location stored in the register to access the memory device in order to service the transaction.

18. The non-transitory computer readable storage medium as recited in claim 15, wherein the register identification is usable by the target node to access the register and identify the address of the given memory location that corresponds to the transaction.

19. The non-transitory computer readable storage medium as recited in claim 15, wherein the packet comprises an opcode that indicates an operation to perform on an address stored in the memory location.

20. The non-transitory computer readable storage medium as recited in claim 15, wherein the program instructions are further executable by a processor to maintain a mapping of the register ID to the address of the given memory location and automatically increment the address of the given memory location that is stored in the register responsive to receiving a transaction of the one or more transactions, wherein a value stored in the register identifies a target memory location of a transaction received from the requesting node.

* * * * *